(12) United States Patent
Jensen et al.

(10) Patent No.: US 11,319,931 B2
(45) Date of Patent: May 3, 2022

(54) METHOD AND AN ASSEMBLY FOR HANDLING WIND TURBINE BLADES

(71) Applicant: Vestas Wind Systems A/S, Aarhus N. (DK)

(72) Inventors: Ivar J. B. K. Jensen, Hornslet (DK); Gunnar K. Storgaard Pedersen, Skjern (DK); Christian Skov Frederiksen, Videbæk (DK)

(73) Assignee: Vestas Wind Systems A/S, Aarhus N. (DK)

( * ) Notice: Subject to any disclaimer, the term of this patent is extended or adjusted under 35 U.S.C. 154(b) by 210 days.

(21) Appl. No.: 16/468,431

(22) PCT Filed: Dec. 4, 2017

(86) PCT No.: PCT/DK2017/050406
§ 371 (c)(1),
(2) Date: Jun. 11, 2019

(87) PCT Pub. No.: WO2018/113868
PCT Pub. Date: Jun. 28, 2018

(65) Prior Publication Data
US 2020/0332769 A1     Oct. 22, 2020

(30) Foreign Application Priority Data
Dec. 23, 2016   (DK) .......................... PA 2016 00794

(51) Int. Cl.
    *F03D 13/10*     (2016.01)
    *B66C 23/18*     (2006.01)
    *F03D 1/06*     (2006.01)

(52) U.S. Cl.
CPC ............ *F03D 13/10* (2016.05); *B66C 23/185* (2013.01); *F03D 1/0658* (2013.01)

(58) Field of Classification Search
CPC ..... B66C 23/185; F03D 1/0658; F03D 13/10; F05B 2230/61
See application file for complete search history.

(56) References Cited

U.S. PATENT DOCUMENTS

2010/0139062 A1*   6/2010   Reed ........................ F03D 13/10
                                                                            29/23.51
2016/0069321 A1*   3/2016   Neumann ............... F03D 13/40
                                                                            414/800

FOREIGN PATENT DOCUMENTS

CN         1688808 A     10/2005
CN      101061310 A     10/2007
(Continued)

OTHER PUBLICATIONS

European Patent Office, International Search Report and Written Opinion in PCT Application No. PCT/DK2017/050406, dated Feb. 14, 2018.

(Continued)

*Primary Examiner* — Moshe Wilensky
(74) *Attorney, Agent, or Firm* — Wood Herron & Evans LLP

(57) ABSTRACT

A method for mounting a blade root of a blade on a blade flange of a wind turbine rotor, the method comprising:— attaching a control line between a hold structure at the blade flange and the blade root; —lifting the blade with a blade lifting crane while the blade root is guided towards the blade flange by use of said control line, and—connecting said blade root to said blade flange.

13 Claims, 5 Drawing Sheets

(56) References Cited

FOREIGN PATENT DOCUMENTS

| | | | |
|---|---|---|---|
| CN | 101823672 | A | 9/2010 |
| CN | 102782311 | A | 11/2012 |
| CN | 202829367 | U | 3/2013 |
| EP | 1925582 | A1 | 5/2008 |
| EP | 2364949 | A1 | 9/2011 |
| EP | 2369174 | A1 | 9/2011 |
| EP | 2538073 | A2 | 12/2012 |
| EP | 2952733 | A1 | 12/2015 |

OTHER PUBLICATIONS

Danish Patent and Trademark Office, Search and Examination Report in PA 2016 00794, dated May 23, 2017.
China National Intellectual Property Administration, First Notification of Office Action in CN Application No. 201780079670.9, dated Apr. 13, 2020.

* cited by examiner

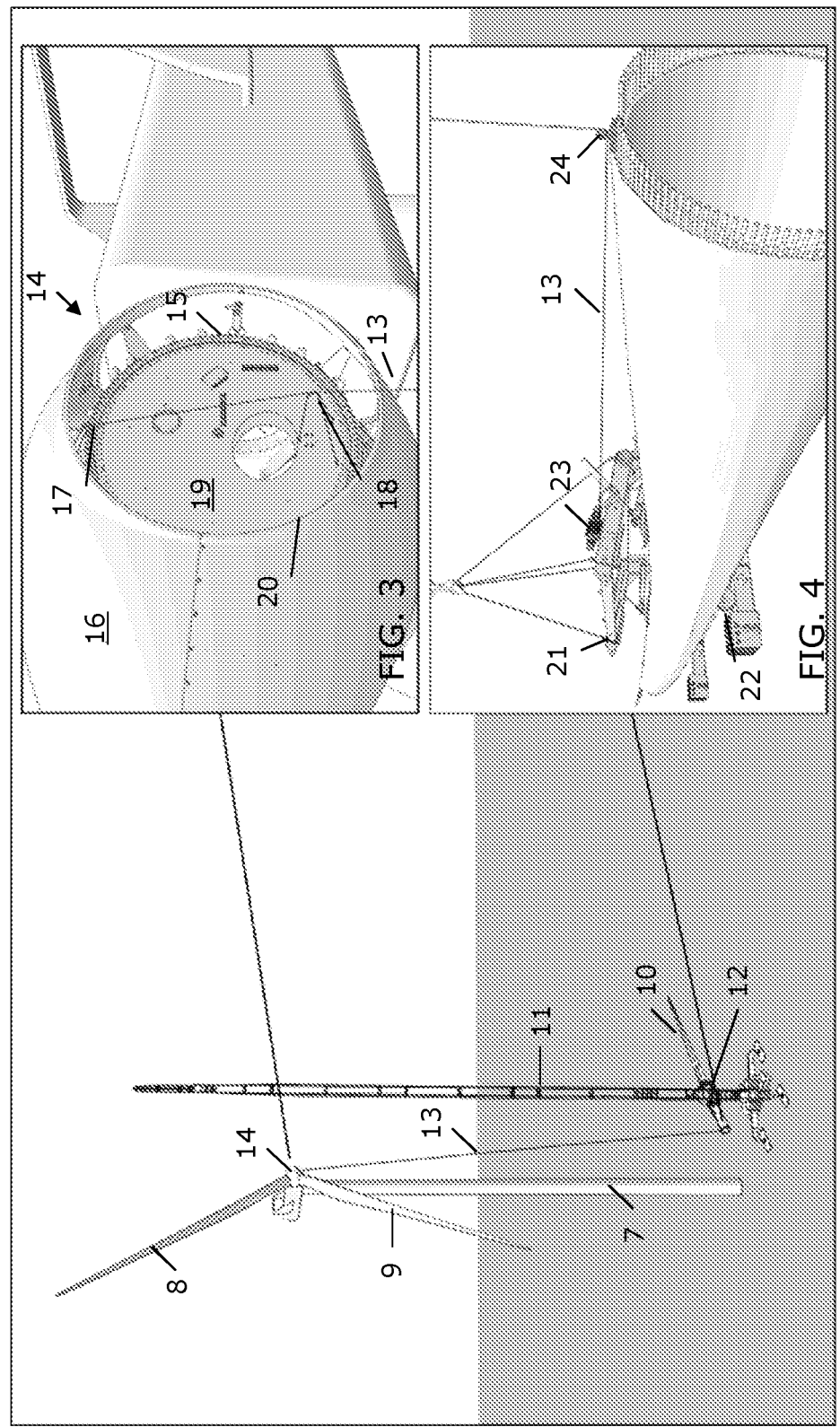

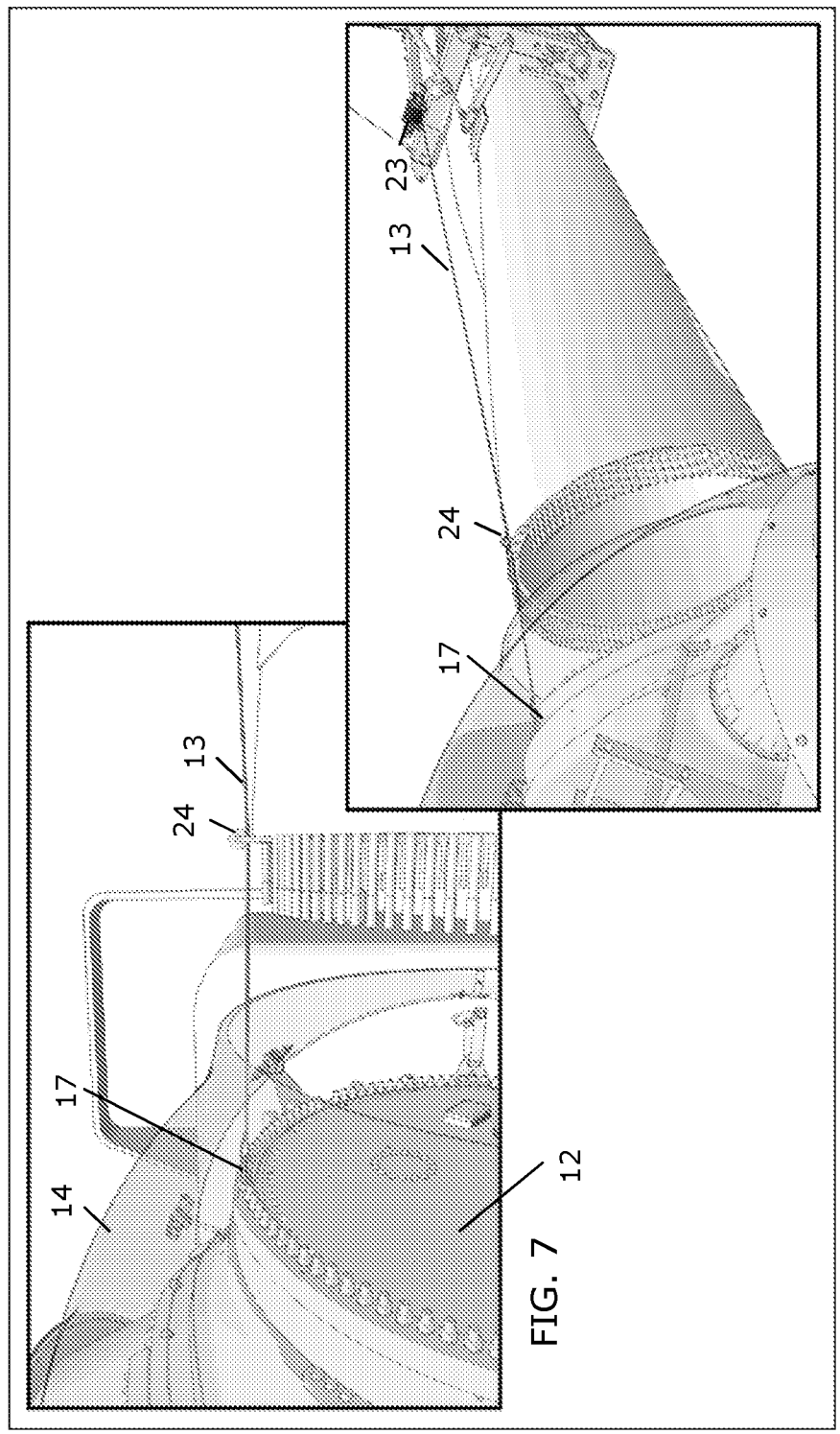

METHOD AND AN ASSEMBLY FOR HANDLING WIND TURBINE BLADES

In wind turbines, wind energy is converted into mechanical energy by blades carried by a hub. The hub is carried by a shaft, which rotates in response to the energy conversion. The size and weight of the wind turbine tower, blades, and drive train have increased over the years and handling during transport and erection of the wind turbines has become more and more challenging.

Modern wind turbines may include towers more than 100 meters tall when installed. A hub, blades, nacelle, and various components to be housed within the nacelle (e.g., a gearbox and generator) must all be raised to this level. One conventional approach for lifting such components includes using a mobile crane, such as a truck-mounted or independently-movable, lattice-boom crane. Mobile cranes are commonly used because of their versatility and ability to be assembled at wind turbine sites, which are often located in remote areas, and moved around at the sites once assembled.

The lifting height and capacity of mobile cranes are limited. Existing tower heights are already a challenge for mobile crane technology, and even when large and expensive lifting equipment is available, difficulties may remain in particular related to assembly operations requiring precise alignment of heavy or large components, particularly in strong wind conditions, or at sea where the lifting crane is typically on a barge which is subject to waves etc. When assembling the blades to the hub, precise alignment of a plurality of bolts relative to a bolted flange is necessary, and due to the large dimensions, even a relative small displacement of the blade relative to the hub may create a large disposition of the bolts relative to the receiving flange.

Accordingly, not only the availability of the cranes becomes a concern.

Resources are also required to align and assemble the wind turbine components at the site where the wind turbine is erected.

Generally, the need for lifting components, particularly for maintenance, has been addressed by installing lifting equipment at the top of wind turbine tower. Such equipment may e.g. lift spare parts into the interior of the nacelle, e.g. through an opening in the floor of the nacelle. The lifting capacity of such equipment is typically limited to 30-40 tons or less.

As can be appreciated, new devices and methods for raising and aligning components at the top of a wind turbine tower are highly desirable.

Accordingly, in view of the present disclosure, a method is provided for mounting a blade on a wind turbine rotor which is carried by a wind turbine structure. The method comprises:
  attaching a control line between a hold structure at the blade flange and the blade root;
  attaching a blade lifting crane to the blade, e.g. via a blade-fixture;
  using the blade lifting crane to carry at least a part of the blade while the blade root is guided towards the blade flange by use of said control line, and
  connecting said blade root to said blade flange.

Since the blade is lifted at least partly by a blade lifting crane while the blade root is guided towards the blade flange, very large and heavy blades can be attached efficiently and safely without facing difficulties reaching the blade flange. Particularly since the control line extends between the blade root and a hold structure at the blade flange, precise positioning is possible.

Since the control line provides positional control while the weight of the blade is carried at least partly by the blade lifting crane, the positioning procedure becomes fast and the duration where the external-blade lifting crane is needed can be reduced. Accordingly, an improved efficiency and a safer and easier working process can be obtained.

In accordance with the present disclosure, the assembly procedure may be initiated by the attachment of a lifting cable of the blade lifting crane to the blade. The blade lifting crane may e.g. be an external crane, e.g. a mobile crane or a crane of a barge. The attachment of the lifting cable of the blade lifting crane may be carried out by attaching a blade-fixture to the blade. The blade-fixture could e.g. be a clamping fixture having a pair of grippers arranged to grip on opposite sides of the blade. The blade could e.g. be gripped at the centre of gravity to thereby create balance and facilitate lifting of the blade, e.g. in an essentially horizontal orientation.

In addition to the lifting cable, the control line is attached to the blade and to the hold structure at the blade flange. Subsequently, the blade is lifted, and the length of the control line between the blade and the hold structure is shortened, e.g. by use of a winch, until the blade root is joined with the blade flange. In this position, the blade is bolted onto the flange, and the control line is released from the hold structure and from the blade. Also the fixture is released from the blade, and the procedure can be repeated for the next blade until all blades are attached.

The combination between the blade lifting crane and a control line enables the use of only one single lifting point. By use of one single lifting point, the blade would normally tend to rotate about the vertical lifting point, and therefore be difficult to position on the blade flange. However, due to the control line, the blade lifting crane may be configured for a single point lifting whereby it suspends the blade along a single vertical lifting cable.

The blade may particularly be lifted in an essentially horizontal orientation, e.g. within plus/minus 10 degrees from horizontal, and rotor may be rotated such that the blade flange is at a 3 o'clock position where the receiving blade flange is vertical, i.e. again between −10 and +10 degrees from vertical, whatever matches the orientation of the blade. In this mutual orientation, the blade can be mounted by a horizontal pull in the control line. In this orientation, the control line may not carry any weight at all, and the blade lifting crane, or other lifting means, may carry the entire weight of the blade during the last part of the movement of the blade towards the blade flange, i.e. once the pull in the control line becomes purely horizontal, the entire weight may be carried by other means than the control line. Accordingly, the control line is not loaded by the weight of the blade during the last part of the movement where the blade root is to fit onto the blade flange.

The control line may be constituted by one or more wires or cables, e.g. steel-wires or robes. The control line may include different structures e.g. for sensing tension or for providing gearing. E.g. for that purpose, the control line may include one or more blocks or pulleys with a loop of wire or robe extending between the block(s).

The blade flange is a flange on the rotor on which flange the blade root is attached. It could e.g. be constituted by a bearing ring of a blade bearing, e.g. the inner ring of a blade bearing or the outer ring of a blade bearing.

The control line is attached between said blade and said hold structure at the blade flange. The hold structure could be constituted by a hook or eyelet fixed to the rotor close to the blade flange, e.g. less than 20 cm. outside the blade flange, or it could be attached directly to the blade flange. The hold structure could also be located inside the rotor. In this embodiment, the control line is wired from the blade into the rotor through a hole, e.g. in the blade flange or in an outer ring of a blade bearing or in a stiffening plate within the inner ring of the blade bearing. In one embodiment, the blade root end comprises a flange with a plurality of bolts. Each of these bolts is received in a hole in the rotating ring of the blade bearing, e.g. the inner ring or the outer ring of the blade bearing. In this embodiment, one of the bolts in the blade root end could be removed, and a control line attached in replacement of the bolt. This control line could be threaded through that hole of the blade bearing which was intended to receive the removed bolt. In that way, the blade could be pulled more precisely towards the correct location on the blade bearing. When the blade is mounted, the control line could be replaced with a bolt inserted into the blade through the blade bearing, i.e. inserted from inside the rotor into the blade.

In one embodiment, the blade flange joins with the blade root along an axial end face, and the hold structure is attached to a radially, peripheral, outer surface of the blade flange, e.g. vertically above the axial end face on which the blade is received. In this way, the blade root can be guided by the control line all the way towards the blade flange until the blade root of the blade joins the axial end face of the blade flange.

In one embodiment, the blade flange is constituted by an inner ring of a blade bearing. In this embodiment, the hold structure may e.g. be a hook or other structure allowing attachment of the control line to the outer ring of the blade bearing In one embodiment, the blade flange is constituted by an outer ring of a blade bearing. In this embodiment, the hold structure may be located e.g. inside the rotor and the control line could be passed through the central opening within the blade bearing.

The control line can be fixed e.g. to the blade root. It could e.g. be tied around the blade root, or a control line holder could be fixed, e.g. bolted or clamped, onto the blade, and the control line be attached to the holder.

The control line could also be attached to the blade-fixture which is used for lifting the blade by the blade lifting crane.

The rotor may include a spinner which is mounted on a hub. The spinner may form a cavity for each blade such that the blade flange is at the bottom of a cavity in the spinner. In this case, the hold structure may particularly be attached inside the cavity to thereby allow the blade root to be pulled into the cavity by use of the control line.

To prevent the control line from damaging the spinner, a wire support may be provided, e.g. fixed on the spinner, or fixed on the blade flange, or fixed to a stiffening plate within the blade flange. The wire support may hold the control line at a support point at an entrance to the cavity, e.g. at a point being outside the cavity but close to the edge extending about the opening into the cavity. The wire support may particularly hold the control line offset from the blade flange, and the wire support may particularly hold the control line releasably, whereby the control line can be released once the blade root is close to the opening into the cavity. In that way, the blade root can be pulled towards the wire support in a first attraction sequence and towards the hold structure in a second attraction sequence, the second sequence starting once the control line is released from the wire support.

A winch for winding up the control line and thus reducing the length of the control line between the blade and the hold structure could be fixed either to the rotor or to the blade. The winch could e.g. be fixed directly to the blade, or it could be fixed to the blade-fixture by which the blade lifting crane lifts the blade. Alternatively, it could be located inside the rotor and wind up a control line which extends through a hole in the rotor or blade flange etc.

The method may comprise the step of attaching a blade root guide at the blade root and guiding the control line from the winch through the blade root guide to the hold structure, e.g. via the aforementioned wire support.

The blade root guide may allow the control line to slide longitudinally relative to the blade root guide. In one embodiment, the blade root guide is simply an eyelet or block through which the control line is guided.

In one embodiment, the control line is allowed to be released completely from the blade root guide, e.g. by pulling in a specific direction. This may facilitate easy detachment of the control line from the blade once the blade is fixed to the rotor.

The weight of the blade may be carried mainly by the blade lifting crane. In one example, the blade lifting crane caries more than 50 pct., or even more than 75 pct. of the weight, e.g. more than 80, 85, 90 or 95 pct. of the weight of the blade. The remaining part of the weight could be carried by the control line. In one embodiment, the blade lifting crane carries the entire weight of the blade and the control line exclusively pulls the blade towards the rotor.

The tension in the control line may be measured constantly or intermittently, and a threshold tension could be defined. If the tension in the control line reaches the threshold, the control line could be slackened, e.g. by controlled operation of the winch or by release of the control line from the hold structure or from the blade. In that way, excessive forces on the blade lifting crane and/or on the wind turbine structure may be prevented. On the contrary, if the tension is too low, the control line could be tightened.

In one embodiment, the control line is controlled, e.g. by controlling said winch, to maintain a specific first tension threshold, e.g. to provide a pull of a specific weight, e.g. 500 kg. Additionally or alternatively, a specific second tension threshold may be defined which should not be exceeded.

The control line may be controlled:

a) to be winded up (shortened) if the actual tension is below the first tension threshold, and/or b) to be un-winded (extended) if the actual tension is above the second tension threshold.

According to control principle a), the control line maintains a steady pull in the blade and thereby supports in keeping the blade in a desired orientation while the blade is mounted.

According to control principle b), the control line is released at least partly if excessive forces are experienced.

The first tension thresholds may e.g. constitute between 10 and 99 percent of the second tension threshold.

In one embodiment, the weight of the blade is carried by a combination between the blade lifting crane and the control line such that the percentage of the weight carried by the control line reduces from a start percentage when the distance from the blade root to the blade flange is large, e.g. when the blade is on ground, to a lover end percentage when the distance from the blade root to the blade flange is small, e.g. when the blade root reaches the blade flange.

In one example, the start percentage is at least 50 percent and the end percentage is at most 5 percent, meaning that the control line carries between 5 and 50 percent of the weight of the blade depending on the distance between the blade root and the blade flange.

The blade lifting crane may particularly be an external-blade lifting crane which is not carried by the wind turbine structure but carried on ground or sea. Alternatively, the blade lifting crane is carried e.g. by the tower of the wind turbine.

The method may further comprise the step of attaching an additional control line between the wind turbine rotor and the blade. The additional control line may be particularly useful in connection with the aforementioned horizontal mounting orientation where the additional control line can be used for carrying a part of the weight of the blade, e.g. when the blade is close to the blade flange where the control line on the hold structure may not any more be capable of carrying the weight due to a horizontal pull direction.

Eventually, once the blade is installed, the control line and the lifting cable are released or uncoupled from the wind turbine blade.

The winch and/or the release of the control line, and/or the additional control line, and/or the lifting cable may be remotely controlled, e.g. from within the rotor or from the blade lifting crane.

In a second aspect, the present disclosure provides a method for removing a blade from a blade flange of a wind turbine rotor, the method comprising:
attaching a control line between a hold structure at the blade flange and the blade root;
attaching a blade lifting crane to the blade;
disconnecting said blade root from said blade flange; and
using the blade lifting crane to carry at least a part of the blade while the blade root is guided away the blade flange by use of said control line.

The method may include any of the features and steps mentioned relative to the method of mounting a blade on a wind turbine.

In a third aspect the present disclosure provides a lifting arrangement for mounting a blade root of a blade on a blade flange of a wind turbine rotor, the arrangement comprising:
a control line attachable to a hold structure at the blade flange;
a blade-fixture for attachment to the blade and facilitating lifting of the blade by use of a blade lifting crane; and
a winch fixed to the blade-fixture and configured to wind up the control line.

The lifting arrangement may further comprise a blade root guide which can be attached to the blade root and which can guide the control line from the winch to the blade flange.

The lifting arrangement may further comprise a wire support configured to be attached to the rotor and to hold the control line at distance from the blade flange. The wire support may particularly be configured to facilitate release of the control line. Release of the control line may be an advantage once the blade root is close to the blade flange such that the blade root of the blade can be pulled directly towards the hold structure.

The lifting arrangement may further comprise a wire control structure with a defined threshold tension, .e.g. a control system embedded in a computer system. The wire control structure may particularly be configured to determine a tension in the control line and to control the winch based on the measured tension and the threshold tension.

The wire control structure may comprise a release structure configured to release the control line based on the determined tension or to release the control line when the blade is mounted to thereby make disassembly of the system fast and easy.

The assembly may further include a release structure configured to release the control line from the hold structure.

BRIEF DESCRIPTION OF THE DRAWINGS

The invention will now be described in further detail with reference to the accompanying drawings in which
FIGS. 2-8 illustrate a sequence of steps carried out during mounting of a blade.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
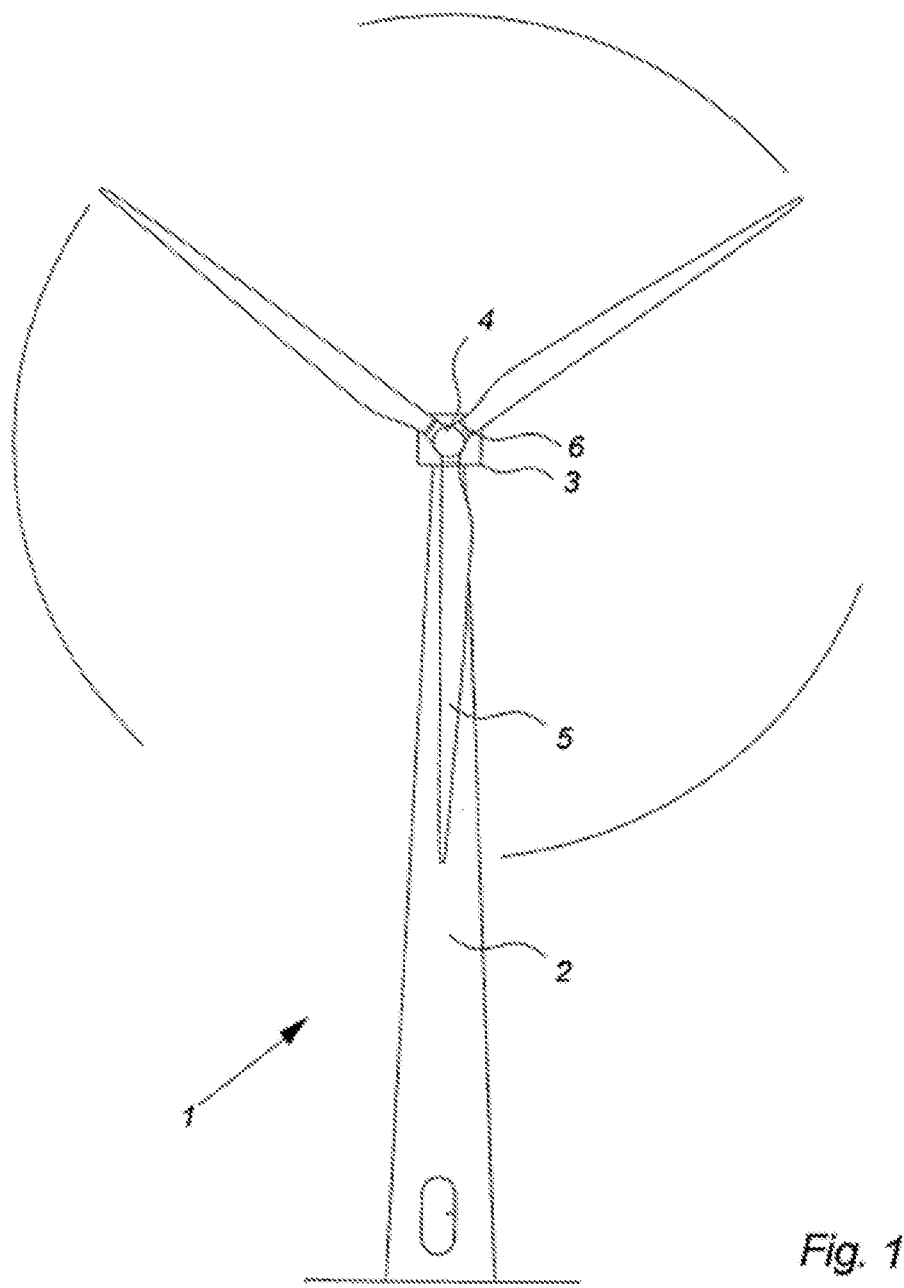
FIG. 1 illustrates a wind turbine comprising a tower, a nacelle, a rotor and blades attached to the rotor.

FIG. 1 illustrates a modern wind turbine 1 with a tower 2 and a wind turbine nacelle 3 positioned on top of the tower. The wind turbine rotor, comprising at least one blade such as three wind turbine blades 5 as illustrated, is connected to the hub 4 through pitch mechanisms 6. Each pitch mechanism includes a blade bearing and pitch actuating means which allows the blade to pitch. The blade bearing includes a blade flange at which the blade root of the blade is fixed to the bearing.

FIG. 2 illustrates a wind turbine 7 on which two blades 8, 9 are already mounted. The third blade 10 is ready at the base of the blade lifting crane 11. The blade lifting crane is an external crane having a blade-fixture 12 which holds the blade symmetrically about the centre of gravity of the blade such that the blade is in balance. The control line 13 extends from the blade root of the blade to the hold structure point at the rotor 14.

FIG. 3 illustrates an enlarged view of the rotor 14. In this view, it is clearly seen that the blade flange 15 is in a cavity formed by the spinner 16. The hold structure 17 is attached directly to the blade flange and the control line 13 extends from the hold structure via a wire support 18 towards the blade which is still at the ground. The wire support 18 is fixed to the stiffening plate 19 which is arranged within the blade flange. The wire support has a height corresponding to the depth of the cavity such that the control line is held at the level of the edge 20 extending about the cavity. In that way, the wire support 18 protects the edges of the spinner from being damaged by contact with the control line.

FIG. 4 illustrates an enlarged view of the base of the blade lifting crane where the blade-fixture 12 is arranged with gripping arms 21, 22 on opposite sides of the blade, ready to grip the blade for lifting it to the level of the rotor. A winch 23 is fixed to the blade-fixture 12 and capable of winding up the control line 13. At the blade root of the blade, the blade root guide 24 guides the control line from the winch 23 towards the rotor. The blade root guide is arranged directly at the edge of the blade to enable the blade being pulled all the way to its location at the blade flange.

Figure 5:
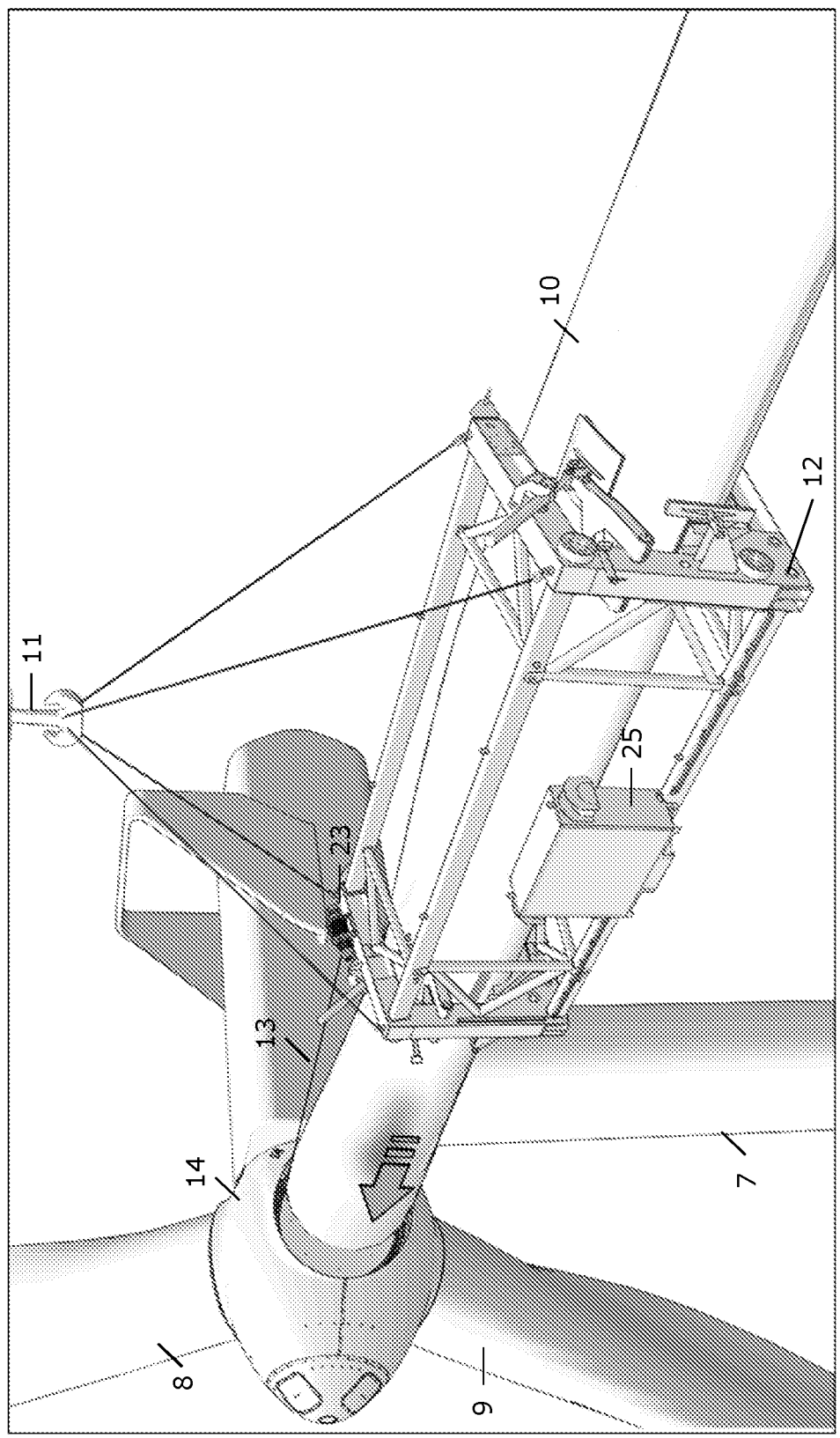

FIG. 5 illustrates the blade when lifted to a position in level with the rotor. The rotor is rotated such that the blade flange becomes vertical, and the blade is arranged essentially in a horizontal orientation. In this illustrated mutual orientation and position of the blade and blade flange, the blade root of the blade can be pulled into the cavity of the spinner and the blade can be fixed to the blade flange. The pulling of the blade towards the blade flange is effected by the winch 23 which is operated remotely either by an operator located in the rotor or by the crane operator.

The control system 25 contains a computer system which controls the winch and a release structure. If the tension in the control line exceeds a limit value, the control system interacts with the human control of the winch and releases the tension. Alternatively, in risk of hazardous uncontrolled forces, the control system releases the control line from the hold structure point to thereby release the blade from the wind turbine structure.

FIGS. 6 and 7 illustrate further details of the procedure. Particularly, FIG. 7 illustrates the location of the hold structure 17 relative to the blade root guide 24 after the control line has been released from the wire support. In this second attraction sequence of the mounting procedure, the blade root is pulled directly towards the blade flange.

Figure 8:
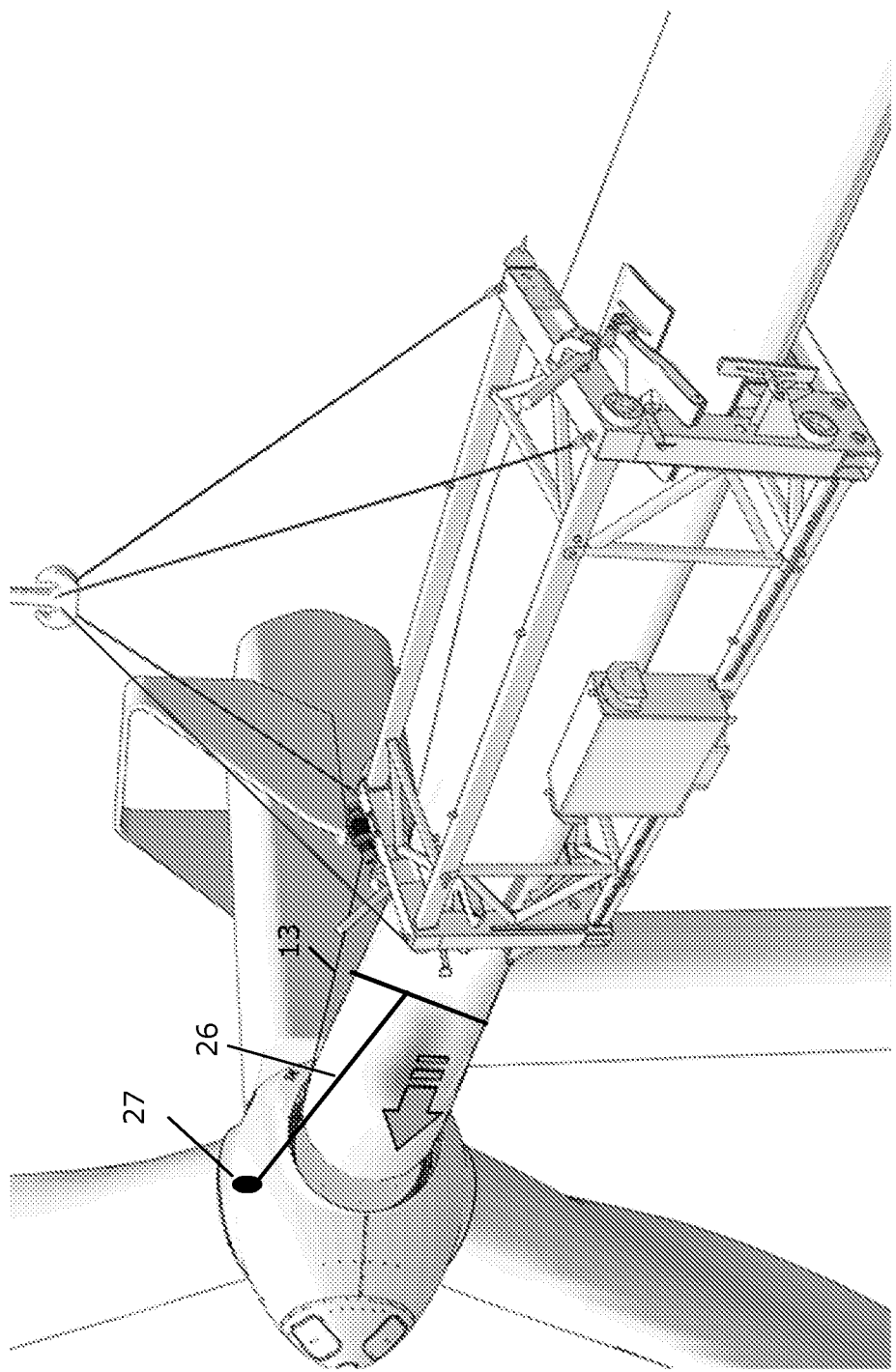

FIG. 8 illustrates an embodiment where an additional control line 26 is attached between the wind turbine rotor and the blade. The additional control line is able to support the control line 13 particularly during the movement of the blade into the cavity in the spinner. In the disclosed embodiment, the additional support line is tied around the blade and fixed at a support-hold structure 27 at which it can be winded up. Alternatively, it is attached to the blade fixture.

The embodiments described above are merely examples of the invention defined by the claims that appear below. Persons skilled in the technical field of handling wind turbine components and mounting blades will appreciate additional examples, modifications, and advantages based on the description. For example, the structure of the hold structure, the blade root guide, the winch and the blade-fixture may deviate from the illustration.

The invention claimed is:

1. A method for mounting a blade root of a blade on a blade flange of a wind turbine rotor, the method comprising:
   attaching a control line between a hold structure at the blade flange and the blade root;
   attaching a blade lifting crane to the blade;
   using the blade lifting crane to carry at least a part of the blade while the blade root is guided towards the blade flange by use of said control line, and
   connecting said blade root to said blade flange when the blade is in a substantially horizontal orientation.

2. The method according to claim 1, wherein a spinner is mounted on the rotor such that the blade flange is located in a cavity of the spinner, and wherein the control line is attached to the hold structure in said cavity.

3. The method according to claim 1, comprising providing a wire support configured to hold the control line at a support point at an entrance to the cavity.

4. The method according to claim 3, wherein the blade root, in a first attraction sequence, is pulled towards the wire support by use of the control line, and wherein the blade root, in a second attraction sequence, is pulled towards the hold structure, the second sequence being initiated by the release of the control line from the wire support.

5. The method according to claim 1, comprising providing a winch configured to wind up the control line.

6. The method according to claim 5, wherein the winch is fixed to a blade-fixture by which the blade lifting crane lifts the blade.

7. The method according to claim 6, wherein the control line is guided from the winch to the hold structure via a blade root guide at said root of said blade.

8. The method according to claim 7, wherein the control line is allowed to slide relative to the blade root guide while the control line is winded up by the winch.

9. A method for mounting a blade root of a blade on a blade flange of a wind turbine rotor, the method comprising:
   attaching a control line between a hold structure at the blade flange and the blade root;
   attaching a blade lifting crane to the blade;
   using the blade lifting crane to carry at least a part of the blade while the blade root is guided towards the blade flange by use of said control line; and
   connecting said blade root to said blade flange,
   wherein the weight of the blade is carried mainly by the blade lifting crane.

10. The method according to claim 1, wherein the control line carries a percentage of the weight of the blade, the percentage changing based on the distance from the blade root to the blade flange.

11. The method according to claim 1, wherein a tension in the control line is measured, a tension threshold is defined, and the control line is controlled based on the measured tension and the defined tension threshold.

12. The method according to claim 1, wherein the blade lifting crane is an external crane not carried by the wind turbine.

13. The method according to claim 1, comprising the step of attaching an additional control-line between the wind turbine rotor and the blade.

* * * * *